United States Patent
Knights

(10) Patent No.: US 10,617,129 B2
(45) Date of Patent: Apr. 14, 2020

(54) FORTIFIED SNACK FOODS AND METHODS OF FORTIFICATION

(71) Applicant: Balanced Nutrients, Santa Rosa, CA (US)

(72) Inventor: Ralph James Knights, Santa Rosa, CA (US)

(73) Assignee: BALANCED NUTRIENTS, Santa Rosa, CA (US)

( * ) Notice: Subject to any disclaimer, the term of this patent is extended or adjusted under 35 U.S.C. 154(b) by 140 days.

(21) Appl. No.: 15/530,684

(22) Filed: Mar. 21, 2015

(65) Prior Publication Data

US 2018/0007928 A1  Jan. 11, 2018

Related U.S. Application Data

(60) Provisional application No. 61/967,572, filed on Mar. 21, 2014.

(51) Int. Cl.
| | |
|---|---|
| *A23L 33/19* | (2016.01) |
| *A23G 3/34* | (2006.01) |
| *A23L 33/185* | (2016.01) |
| *A23P 20/10* | (2016.01) |
| *A23L 19/18* | (2016.01) |
| *A23L 5/40* | (2016.01) |
| *A23C 9/152* | (2006.01) |
| *A23L 7/13* | (2016.01) |

(52) U.S. Cl.
CPC ............ *A23G 3/343* (2013.01); *A23C 9/1526* (2013.01); *A23L 5/40* (2016.08); *A23L 7/13* (2016.08); *A23L 19/18* (2016.08); *A23L 33/185* (2016.08); *A23L 33/19* (2016.08); *A23P 20/10* (2016.08)

(58) Field of Classification Search
None
See application file for complete search history.

(56) References Cited

U.S. PATENT DOCUMENTS

| | | |
|---|---|---|
| 183,024 A | 10/1876 | Boss |
| 633,834 A | 9/1899 | Gruendler |
| 1,291,396 A | 8/1918 | Butternan |
| 3,830,941 A | 8/1974 | Luft |
| 4,212,892 A | 7/1980 | Chanhine |
| 4,260,637 A | 4/1981 | Rispoli |
| 4,600,588 A | 7/1986 | Ernster |
| 5,894,027 A | 4/1999 | Kazenzadeh |
| 6,830,768 B2 | 12/2004 | Neidlinger |
| 7,556,836 B2 | 7/2009 | Meuller |
| 7,691,430 B2 | 4/2010 | Marsland |
| 8,551,544 B2 | 10/2013 | Borders |
| 8,741,370 B2 | 1/2014 | Ganjyal |
| 8,697,159 B2 | 4/2014 | Nack |
| 2008/0317907 A1 | 12/2008 | Thomas |

OTHER PUBLICATIONS

U.S. Dairy Export Council, "Milk Protein Isolate", http://www.thinkusadairy.org/products/milk-proteins/milk-protein-categories/milk-protein-isolate, downloaded Apr. 11, 2018. (Year: 2018).*
A Food Labeling Guide, Guidance for Industry, U.S. Department of Health and Human Services, Food and Drug Administration, Center for Food Safety and Applied Nutrition, Jan. 2013.
Casein Glues: Their Manufacture, Preparation, and Application, USDA Bulletin, 1967.
Dietary Protein Quality Evaluation in Human Nutrition, FAO Food and Nutrition Paper 92, Relevant parts—p. 11, p. 19, & Table 5, p. 29, 2011.
Ebnesajjad, S., Handbook of Adhesives and Surface Preparation: Technology, Applications and Manufacturing, Elsevier, $1^{st}$ Edition, 2010.
Guo, M., et al., Milk Protein Polymer and Its Application in Environmentally Safe Adhesives, Polymers, vol. 8, pp. 324, 2016.
Han, J.H., et al., Physical Properties of Whey Protein Coating Solutions and Films Containing Antioxidants, Journal of Food Science, vol. 72, No. 5, pp. E308-E314, 2007.
Millward, D.J., Amino Acid Scoring Patterns for Protein Quality Assessment, British Journal of Nutrition, vol. 108, pp. S31-S34, 2012.
Perez-Gago, M.B., et al., Drying Temperature Effect on Water Vapor Permeability and Mechanical Properties of Whey Protein-Lipid Emulsion Films, Journal of Agricultural and Food Chemistry, vol. 48, No. 7, pp. 2687-2692, 2000.
Petrie, E.M., Handbook of Adhesives and Sealants, McGraw Hill, $2^{nd}$ Edition, New York, 2007.
Protein-Fortified Chocolate Compound Coating, U.S. Dairy Export Council, 2014.
Seung-Il, C., et al., Production and Properties of Edible Film Using Whey Protein, Biotechnology and Bioprocess Engineering, vol. 2, No. 2, pp. 122-125, 1997.

(Continued)

*Primary Examiner* — Elizabeth Gwartney
(74) *Attorney, Agent, or Firm* — Knobbe, Martens, Olson & Bear, LLP

(57) ABSTRACT

Improved adhesion of powdered and particulate color and flavoring to dry snack foods such as, but not limited to: chips, pretzels, crackers, and puffed, popped, baked or extruded compositions is provided. The improved adhesive is a milk or water based composition with added high quality protein selected from one or more of milk, whey, milk concentrate, whey concentrate, isolated milk protein, soy concentrate, soy milk, soy isolate, egg, egg white, egg protein isolate, or combinations from animal, grain or legume sources with an essential amino acid composition that meets human growth and maintenance standards. The improved adhesive is applied to the surface of snack foods providing an adhesive surface for binding dry flavoring and colors. Examples show snack food compositions with improved nutrient content including reduced fat content, an increase in protein content and a beneficial increase in the protein quality measured by the Protein Digestibility Corrected Amino Acid Score.

25 Claims, No Drawings

(56) References Cited

OTHER PUBLICATIONS

Title 21, U.S. Code of Federal Regulations, Section 101, Subsection 9(c)(7).
USDA National Nutrient Database for Standard Reference, Release 27, USDA Research Service, Aug. 2014.
White Chocolate & Confectionary Coatings, Bloomer Chocolate Company, Accessible on the World Wide Web at http://www.blommer.com/products-white-chocolate.php, Original publication date unknown; Accessed on Jan. 25, 2018.
Zhou, J.J., et al., Preparation and Characterization of Whey Protein Film Incorporated with TiO2 Nanoparticles, Journal of Food Science, vol. 74, No. 7, pp. N50-N56, 2009.

\* cited by examiner

FORTIFIED SNACK FOODS AND METHODS OF FORTIFICATION

CROSS REFERENCE TO RELATED APPLICATIONS

This application claims the benefit of U.S. Provisional Application No. 61/967,572, filed on Mar. 21, 2014, which is hereby incorporated by reference in its entirety.

SUMMARY

The invention is an adhesive for binding powdered flavor and color to a low moisture snack food. Specifically, the adhesive is a water or milk based composition containing 5% to 25% high quality protein and applied to chips, crisps, crackers and extrusions prior to dusting or coating with flavor and color. Using the adhesive slurry at 6% to 20% of a snack food provides a lower fat content for the finished snack, increases the snack food protein content and increases the snack food protein quality so that more of the protein within the snack food can be counted as contributing to the daily intake of protein.

DETAILED DESCRIPTION

For this invention and description, snack foods are low moisture compositions including, but not limited to chips, pretzels, crackers and low moisture compositions that may be extruded, puffed, baked or popped. A typical snack food may be consumed alone, with a beverage, as part of a meal or in combination with another snack food composition such as a dip or spread. The principle component of a snack food may include, but is not limited to wheat, corn, rice, potato and other grain or vegetable ingredients. A typically snack food serving provides 2% to 4% of the recommended daily intake of protein, 4% to 7% of the recommended daily intake of carbohydrate and 7% to 16% of the daily intake of fat. The protein present in snacks made from wheat, corn and other vegetable flours typically have a reduced level of some of the essential amino acids that are required for growth and maintenance. This means that 30% to 70% of the protein in these snack foods does not count towards meeting the daily intake or Daily Value requirements for protein. Snack foods are usually high in fat and low in protein. It is the intention of this invention to reduce the fat content and increase the protein content of snack foods.

The invention is a milk or water based slurry, solution, emulsion or suspension of high quality protein applied to dry snack foods, and preferably applied to the surface of low fat baked, extruded or puffed snacks, prior to dusting or coating with powdered flavor or color compositions using equipment and in a fashion commonly practiced in snack food manufacturing. The term solution or water based solution is meant to include oil and water compositions and suspensions or slurries of partially soluble materials such as soy protein isolate. Low molecular weight emulsifiers such as lecithin or mono- and diglycerides are not used to create or maintain the oil in water emulsions. Homogenized full fat milk, for instance, would be a solution with fat that does not rise to the top and with milk minerals and proteins that do not sediment. The adhesive is made to contain between 3% w/w and 25% w/w additional high quality protein, and preferably between 6% and 15% additional high quality protein.

High quality proteins are those with a calculated Protein Digestibility Corrected Amino Acid Score, PDCAAS, value greater than 1.0 (or greater than 100%) and having an excess of all of the essential amino acids needed for growth and maintenance. In contrast, most of the proteins of snack foods are lower quality proteins with PDCAAS values of 30% to 70% and having one or more of the essential amino acids lower than the proportion needed to qualify the protein as suitable for growth and maintenance. It is commonly understood that a composition with proteins from different sources may be useful in raising the PDCAAS value for the composition. Such protein combinations are said to be complimentary because the excess of one or more essential amino acid in one food protein may mathematically make up for the low level of those essential amino acids in another food protein of the composition. Commercially available, high quality proteins include, but are not limited to proteins from milk, egg, and, for some situations, soy. One of the benefits of using high quality proteins in the present invention is to raise the PDCAAS value of the finished snack so that more of the protein is counted as suitable for growth and maintenance.

The fat content of the invention may be between 0% and 20% of the adhesive and preferably between 0% and 10%. Moisture added to the snack food composition by applying the improved water based adhesive may be reduced by passing the adhesive coated and powder coated snack food composition through an oven commonly used in the practice producing a finished composition having a moisture content less than 10% and preferably less than 3% providing a snack composition that can be packaged and stored safe from microbiological growth without refrigeration.

BACKGROUND

Most snack foods currently have flavoring and some coloring coated on the surface of the snack food. This allows the manufacturer to prepare a single, unflavored snack base and, in separate operations, apply a variety of flavorings and/or colors to meet perceived consumer preferences. Most of the flavoring and coloring components are powders or small particles that are attached to the surface of the base food composition using a food grade mastic or adhesive. A widely used adhesive for attaching flavors and colors to snack foods is a food grade fat or oil applied by spraying, drizzling or dipping the base snack food. Powdered or particulate flavoring and coloring may then be applied to the base snack food containing the added fat or mastic.

A number of snack foods and their nutrient profiles are included in The USDA National Nutrient Database for Standard Reference, Release 27. For the purposes of this description, foods that are included in the USDA Database will be referred to as USDAxxxxx where the xxxxx is the five digit number assigned to the food by the USDA. Table 1 is a sampling from the USDA Database and is included here as part of the demonstration of the benefits of the invention.

A typical snack food may contain 15% to 40% fat from the combination of food ingredients other than oil, oil added as a functional ingredient such as shortening, oil used in cooking and oil applied as a mastic or adhesive for flavoring and color attached to the snack food surface. One intention of the improved adhesive of this invention is to provide one 28 gram serving of the flavored and colored snack food with less than 4 grams of fat (less than 14% w/w), and preferably less than 2 grams of fat (less than 7% w/w).

Grain ingredients lack certain essential amino acids. The amount of protein that may be claimed as meeting Daily Intake requirements, or a Percentage of the Daily Value (% DV), is typically only 30% to 60% of the protein content of the snack food.

International standards for calculating protein quality based on the Protein Digestibility Corrected Amino Acid Score, PDCAAS are referenced in 21 CFR 101.9(c)(7), Millward (2012), U.S. Food and Drug Administration Guidance for Industry (2013) and the FAO Food and Nutrition Report 92 (2011).

For the purposes of this invention, and from the references above, Table 2 shows the amounts of Essential Amino Acids required for each 1.0 gram of protein that is suitable for human maintenance and growth. To the extent that any of the Essential Amino Acids are at a level less than 100% of the required amount, the protein content of the food that may be counted as a portion of the Daily Intake, or % DV must be reduced by the same percentage. For the purposes of this invention, this is the Amino Acid Score. To simplify PDCAAS calculations, it is assumed that the proteins of snack foods are all digested at close to 100%, and the Amino Acid Score will not be corrected for the percent digested when referring to the amount of protein that can be counted as contributing to the Daily Intake of protein or the Daily Value (DV of protein).

Snack foods made from grains have insufficient Lysine to meet the requirements for high quality protein. The Amino Acid profiles of referenced snack foods and, in particular, the Essential Amino Acid profiles of referenced snack foods are taken from the USDA Database (2011). The Essential Amino Acid content from the USDA Database are compared to the FAO/WHO requirements in Table 2 to calculate the protein quality or Amino Acid Score which is then used to calculate the percentage of the snack food protein that can be counted as meeting the Daily Intake requirements. Table 3 shows the same snack foods listed in Table 1 and includes the protein content in grams per 28 gram serving, the Lysine content in mg per gram of protein, the Amino Acid Score and the amount of protein per serving of the snack that contributes to the Daily Intake of Protein.

Typical snack foods may contain 1 to 3 grams of protein per 28 gram serving based on the Amino Acid Score of the snack food. It is another intention of the patent to replace a fat based adhesive with one that contains sufficient high quality protein to raise the protein level of the snack food by at least 1 gram per 28 gram serving. An additional benefit is that the essential amino acids from the high quality proteins of the adhesive improve the overall quality of the protein in the snack composition. Thus, for most grain based snacks, each 1 gram of adhesive protein results in more than one additional gram of protein being added to the Daily Intake or Daily Value of protein per 28 gram serving of the snack with the improved adhesive.

As a demonstration of the nutrient proportions provided by each of the aforementioned USDA Reference snack foods, Table 4 shows the daily intake of Fat, Carbohydrate and Protein for one 28 g serving of the snack in both grams per serving and as a percentage of the Recommended Daily Intake for a person consuming 2000 calories per day. The Recommended Daily Intake amounts are 65 g of fat, 300 g of carbohydrate and 50 g of protein as shown at the bottom of Nutrition Facts panel on packaged food.

In Table 4, the USDA referenced snack foods provide 2% to 4% of the recommended daily intake of protein, 4% to 7% of the recommended daily intake of carbohydrate and 7% to 16% of the daily intake of fat. It is the intention of this invention to provide similar snack foods that have less fat and more protein that contributes to the recommended daily intake of protein.

High protein snack foods, such as those described in U.S. Pat. Nos. 8,741,370, 7,691,430, 7,556,836, 6,830,768, 4,212,892 and others are made with wheat proteins and/or high quality proteins with the intention of providing the consumer with two to ten times more protein than a typical snack. Protein fortified snack foods that may have flavors or colors added to the surface of the snack would benefit from the present invention providing an additional amount of high quality protein in the form of an improved, low fat adhesive for the added flavors and colors.

Milk, egg, fish and animal hide extracts have been used to make adhesives for over 4000 years. These are water based protein containing adhesives that are used to join porous materials like wood or paper. The first commercial manufacturing of casein glue (a milk protein glue) was established in the late 18$^{th}$ century; see Ebnesajjad, Sina (2010). Casein glue is made by dispersing an acid precipitated milk protein, casein, into water and adding alkali to make a near neutral pH, soluble caseinate. The caseinate preparation may be applied to the surface of a number of porous materials forming an adhesive layer that will subsequently bind or adhere to another material. In a large compilation of adhesive technology by E. M. Petrie (2007) the word food is mentioned only once in over 750 pages and that reference is to the use of polyvinyl alcohol for food packaging.

U.S. Pat. No. 5,894,027 describes the coating of a dry breakfast cereal with milk and proteins in order to mimic cereal and milk when water is added to the food composition. The milk, proteins and other nutrients are powdered ingredients bound to the dry cereal surface with a water based adhesive composed of a water soluble member selected from the group consisting of maltodextrin, sodium alginates, propylene glycol alginates, guar gum, locust bean gum, gum Arabic, pectin, kappa carrageen, carboxymethylcellulose, methylcellulose, hydroxypropyl methylcellulose, xanthan, hydrocolloids, and mixtures thereof. The adhesive of U.S. Pat. No. 5,894,027 is composed of water and complex carbohydrates and does not teach that proteins can be used in a water based adhesive for binding other powdered ingredients to the cereal based composition or to snack foods.

U.S. Pat. No. 4,260,637 to Rispoli et al. describes an improvement in bread crumb coating on foods when proteins were first bound to the surface of the bread crumbs. The proteins were selected from the group consisting of whey protein, milk protein, soy isolate, gelatin, egg albumin, wheat gluten, and mixtures thereof. The protein is applied as a powder, not as a slurry, solution, emulsion or suspension. Furthermore, the powdered proteins were bound to the bread crumb surface using food oil as the adhesive. Although the proteins were reported to improve the binding of the bread crumbs to moistened foods, U.S. Pat. No. 4,260,637 does not teach about proteins being an adhesive for low moisture snack foods and does not teach about the added protein imparting a nutritional benefit to the food.

It is widely known that unbaked pretzels may be coated with an egg wash or a milk wash before adding the coarse salt seasoning. However, almost all of the commercial pretzel compositions include salt as an ingredient, but neither egg nor milk is included in the packaged food ingredient statements. Keeping the seasoning on a pretzel does not appear to require an egg or milk adhesive. The coarse salt likely binds to the moist surface of the parboiled pretzel dough, and during the subsequent baking process, the warm dough is the likely adhesive for salt and other seasonings. In contrast, this invention uses milk or a water based composition of high quality proteins as an adhesive for seasonings applied to low moisture snack foods including pretzels with an added nutritional benefit of improving the quantity and the quality of protein in the snack food. Pretzels (USDA reference 19047) contain almost three grams of protein per serving, but less than 50% of that protein can be counted as contributing to the Daily Intake of protein. Using this invention, the protein quality and the protein content of pretzels would both be increased.

Cheese might be considered an adhesive for binding two parts of a processed food together. In considering cheese as an adhesive, the standard process for making cheese, 21 CFR 133, requires lactobacilli to ferment, or convert a portion of the milk sugar to lactic acid. An enzyme is added so that certain peptide bonds of milk protein are broken with the release of a certain glycomacropeptide. The selective and limited hydrolysis of milk protein is catalyzed by the enzyme rennet or by chymosin, a unique bacterial enzyme that mimics the action of rennet. This enzyme treatment changes the milk proteins at a molecular level so that the modified milk proteins form a cohesive curd, sticking together and trapping milk fat, calcium phosphate and some of the carbohydrate in the cheese matrix. By contrast, the invention described here does not use a fermentation step and does not use rennet or chymosin to produce proteins suitable for binding color or flavor to snack foods.

U.S. Pat. No. 3,830,941 to L. R. Luft et al. and U.S. Pat. No. 8,697,159 to T. J. Nack et al. claim the use of an oil-in-water emulsion as a coating on snack foods. U.S. Pat. No. 3,830,941 uses low molecular weight mono- and diglycerides to form and stabilize the emulsion. As an option, the composition may also contain from 1% to 15% protein for stability and for flavor attributes. The proteins include non-fat milk, caseinate, whey, soy flour, soy concentrate, soy isolate, vegetable proteins, cottonseed protein and the like. The emulsion is made to include water soluble flavors and colors added to the water component of the emulsion, and the emulsion includes oil soluble flavors and colors added to the oil component of the emulsion. The flavors, colors and emulsion are applied as a single composition that is heated to form a dry coating on the snack food. In contrast, the present invention uses skim milk, homogenized low fat or whole milk and high quality proteins such as those from milk, egg and soy as an adhesive for binding powdered flavors and powdered colors that are added after the adhesive is first applied to the snack food. U.S. Pat. No. 3,830,941 does not teach that high quality proteins can add to the protein content of the snack and improve the protein quality of the snack. In contrast, the adhesive of the present invention is applied before powdered flavors and colors are applied and the intention of the present invention is to raise the quantity and quality of the protein in a typical snack food composition.

In U.S. Pat. No. 8,697,159 to T. J. Nack et al., describe an oil in water emulsion with water and oil soluble flavors and colors. U.S. Pat. No. 8,697,159 states that protein may optionally be added to an emulsion that is used to coat a food or an unflavored snack composition. The patent teaches that it may be required to add protein to the emulsion for functionality purposes such as aiding in emulsification and stability, providing the desired texture, and forming the desired film consistency, thickness, appearance, and to avoid blistering. Proteins of choice are whey protein and soy protein. As expressed in U.S. Pat. No. 3,830,941, and in contrast to the present invention, the coating composition of U.S. Pat. No. 8,697,159 has flavors and colors added to the wet emulsion rather than powdered flavors and colors being added to the food composition after first coating the food with an adhesive. U.S. Pat. No. 8,697,159 does not mention protein in any of the claims and does not teach that the protein content or the protein quality of the snack food can be improved.

US patent application 20080317907 is a method and apparatus for applying aqueous coating to cooked foods. The aqueous coating contains a film forming agent (claim 1) which is selected from the group consisting of carbohydrates and proteins (dependent claim 15). The aqueous coating also contains ingredients selected from the group of flavors, colors, fats emulsifiers, minerals, vitamins fiber and antioxidants. The water in the coating is flashed off by the latent heat within the food composition that is to be coated. The inventors state that flashing off the moisture produces a dry composition. The dry composition may be further treated with oil before applying dry flavors, colors, and seasonings. The patent application does not teach that protein ingredients added to milk or to an aqueous preparation can be used to bind powdered materials to the surface of a low moisture food or a snack food. In contrast to the present invention, patent application 20080317907 does not teach that proteins in the coating will reduce the fat, increase the protein content or increase the protein quality of the finished food.

The USDA and FAQ/WHO recommend that a typical adult daily diet of 2000 calories should include about 50 grams of protein which represents about 200 calories or about 10% of the total daily caloric intake from food. The daily intake of fat should be around 65 grams and the daily intake of carbohydrate is recommended to be around 300 grams. Foods that are relatively high in protein include beans, nuts, meat, eggs, and milk. It is also recommended that each meal should be balanced so that the daily intake of protein, fat and carbohydrate are evenly proportioned in each meal. Snacks can also be nutritionally balanced and follow the USDA guidelines. Consuming a snack of nuts and fruit, for instance, would provide a balance of protein, fat and carbohydrate. Some snack foods, like beverages with protein, fat and carbohydrates, or breakfast bars or foods categorized as nutrition bars are designed to provide calories from all three sources. However, typical snacks consist of confections, candies, baked goods, and savory snacks like chips, pretzels or puffed extrusions. These typical snacks are high in fat and carbohydrate and low in protein relative to the recommended daily intake of calories from protein, fat and carbohydrates. A typical snack either adds calories on top of the recommended daily caloric intake and the typical snack does not contain a proportional contribute to the daily consumption of protein.

Milk is a common ingredient found on the labels of a variety of snack foods. Milk is usually found on snack food labels as part of the flavoring. As examples and without limitation, Cheese flavor, Ranch flavor and Sour Cream flavor inherently contain milk as an ingredient. Snack foods using these flavors also must be labeled with milk as an ingredient. With milk as a component of a dry or powdered flavoring system, the milk proteins have no function in adhesion and provide only a small contribution to the nutritional value of the snack food protein. As a by-product of cheese making, powdered whey that has not been processed by ultra-filtration has a composition that is roughly 70% lactose and 12% protein. As a reference, powdered non-fat milk is roughly 50% lactose and around 35% protein. Whey is typically used as an ingredient in baked foods and snack foods to add dairy solids that may or may not contribute to functional aspects of the food during processing. Although the nutritional quality of whey protein is high, whey and whey powder are principally carbohydrate and when used as portion of a flavoring, the low level of protein has little effect on the overall quality of the snack protein. It is the purpose of this invention to demonstrate how milk, milk proteins, milk protein concentrates and whey protein concentrates can be used to reduce the fat content of snack foods and contribute to both the protein quantity and the protein nutritional value.

U.S. Pat. No. 8,551,544 to Borders et al. (2013) describes a protein based binder or coating system for particulate- and/or powder-type food systems. The only protein described with adhesive properties is wheat protein isolate. Other proteins may be added to the wheat protein isolate, but none are described as contributing to the binding or adhesive character of the mixture. Wheat protein isolate dispersed in water is used to coat some or all of the particulate or powdered ingredients so that all of the ingredients will bind together forming a cluster of particulates or a snack bar. Although '544 mentions the use of this wheat protein binder with powdered flavors and colors, the flavors and colors are part of the dry ingredients mixed together in food bars, snack pieces, and cereal clusters. There is no anticipation that the protein based binder system of '544 would find use in binding flavors and colors to the surface of solid snack foods like chips, crackers, pretzels, or puffed extrusions. Wheat protein isolate of '544 is an incomplete protein with a low content of Lysine and a PDCAAS of only about 32%. Unlike the invention described here, Wheat Protein Isolate and '544 does not and cannot raise the protein nutritional value of grain based or vegetable based snack foods.

EXAMPLES

Example 1. Tortilla Chips with Increased Protein and Increased Protein Quality

Unflavored Tortilla chips are made by a typical process used by those trained in the art. In general, corn flour is treated with Calcium Hydroxide, cooked, steeped, washed, kneaded and mashed or milled to produce dough with the appropriate particle size and characteristics. The dough composition is rolled to the desired thickness, cut into chips and baked to reduce the moisture content and provide the desired color and texture. 100 kilogram of the unflavored chips are tumbled and sprayed with 16 to 18 kilograms of a water based composition consisting of 65 parts non-fat liquid milk heated to 160 degrees F., plus 13 parts non-fat dry milk, plus 12 parts of WPC 80 (whey protein concentrate that is 80% protein) plus 10 parts canola oil. While being tumbled, salt is added and the crisps are moved through an oven that reduces the moisture content to less than 10%. The yield is approximately 107 to 110 Kg after spraying with the water based adhesive, adding 0.4% salt for flavoring and baking to reduce the moisture content to less than 10% w/w of the finished composition. Table 5 shows the composition of USDA 19056, Salted Tortilla Chips, and the composition of Salted Tortilla Chip resulting from the improved adhesive invention. Table 6 shows the Protein Values for one 28 gram serving of the USDA and the improved chips. Table 6 also shows the Lysine content and the PDCAAS correction to the protein level based on the requirement for having 51 milligrams of Lysine per gram of protein.

Compared to the USDA reference, one serving of the improved tortilla chips has less than 50% of the fat, an increase of 1 gram of protein and an increase in protein quality resulting in an additional 1.4 grams of protein contributing to Daily Intake. The nutrient contents are not limited to these particular values, but this example demonstrates the three improvements provided by the invention: 1) an increase in protein content, 2) an increase in protein quality, and 3) a decrease in fat. Flavoring is not limited to salt as used in this example. Using the improved adhesive, other powdered flavors or spice particles may be applied in a similar fashion with the same results of lowering the fat and increasing the protein content and the protein quality.

Example 2. Pita Chips with Increased Protein and Increased Protein Quality

Unflavored Pita Chips are made by a typical process used by those trained in the art. In general, dough is formed by combining wheat flour, water, yeast, salt and optional enzyme and vegetable oil. The dough is allowed to rise, kneaded rolled to the desired thickness, cut into chips and baked to reduce the moisture content and provide the desired color and texture. 100 kilogram of the unflavored chips are tumbled and sprayed with 16 to 20 kilograms of a water based composition consisting of 75 parts of reconstituted non-fat milk, plus 20 parts of milk protein concentrate with 70% protein plus 5 parts of Whey Protein Concentrate that is 80% protein. While being tumbled, salt is added and the crisps are moved through an oven that reduces the moisture content to less than 10%. The yield is approximately 107 to 110 Kg after spraying with the water based adhesive, adding salt for flavoring and baking to reduce the moisture content to less than about 3% w/w of the finished composition. Table 7 shows the composition of USDA 25037, Salted Pita Chips, and the composition of Salted Pita Chips resulting from the improved adhesive invention. Table 8 shows the Protein Values for one 28 gram serving of the USDA and the improved chips. Table 8 also shows the Lysine content and the PDCAAS correction to the protein level based on the requirement for having 51 milligrams of Lysine per gram of protein.

Compared to the USDA reference, one serving of the improved pita chips has less than 50% of the fat, an increase of 1 gram of protein and an increase in protein quality resulting in an additional 1.9 grams of protein contributing to Daily Intake. The nutrient contents are not limited to these particular values, but this example demonstrates the three improvements provided by the invention: 1) an increase in protein content, 2) an increase in protein quality, and 3) a decrease in fat. Flavoring is not limited to salt as used in this example. Using the improved adhesive, other powdered flavors or spice particles may be applied in a similar fashion with the same results of lowering the fat and increasing the protein content and the protein quality.

Example 3. Potato Crisps with Increased Protein and Increased Protein Quality

Regular Salted Potato Chips, USDA 19411, provide 1.8 g of high quality protein and almost 10 grams of fat per serving. One 28 gram serving of Salted Potato Crisps made from dried potato, USDA 19410, provides 1.3 g of high quality protein and 10 g of fat. Much of the fat results from cooking in oil and leaving a significant amount of oil on the potato crisp as the adhesive for flavoring. It is presumed that baked potato crisps made from dried potato flour or flakes may contain less fat but vegetable oil may still be the preferred adhesive for powdered flavoring. It is the Intention of this improvement to demonstrate that a water based adhesive composition with a high quality protein will reduce the fat content and increase the amount of high quality protein. Unflavored Potato Crisps from dried potato are typically made by combining potato flour or dried potato flakes, a vegetable flour such as rice flour, starch, vegetable oil and water to form a cohesive dough. The dough is rolled to a thin sheet and cut into the desired shape. The thin pieces are either baked or fried in oil and then seasoned. In this example, the dough is baked to produce a low fat crisp. 100 kilogram of the unflavored potato crisps are tumbled and sprayed with 15 to 17 kilograms of a water based composition consisting of 77 parts of non-fat milk, plus 13 parts of milk protein concentrate that is 70% protein plus 10 parts of WPC 80% (whey protein concentrate that is 80% protein). While being tumbled, salt is added and the crisps are moved through an oven that reduces the moisture content to less than 10%. The yield is approximately 104 to 106 Kg after spraying with the water based adhesive, adding salt for flavoring and baking to reduce the moisture content. Table 9 shows the composition of USDA 19410, Salted Potato Chips made from dried potato, and the composition of Salted Potato Crisps resulting from the improved adhesive invention. Table 10 shows the Protein Values for one 28 gram serving of the USDA and the improved crisps.

Compared to the USDA reference, one serving of the improved potato crisp has less than 50% of the fat, an increase of 1 gram of protein and an increase in protein quality resulting in an additional 1.4 grams of protein contributing to Daily Intake. The nutrient contents are not limited to these particular values, but this example demonstrates the three improvements provided by the invention: 1) an increase in protein content, 2) an increase in protein quality, and 3) a decrease in fat. Flavoring is not limited to salt as used in this example. Using the improved adhesive, other powdered flavors or spice particles may be applied in a similar fashion with the same results of lowering the fat and increasing the protein content and the protein quality.

Example 4. High Protein Soy Crisps with an Increase in High Quality Protein and a Decreased Fat Content Seasoned soy chips or seasoned soy crisps, such as USDA 25025, are made by a process where a composition of soy concentrate or soy isolate, rice flour, salt and vegetable fat is extruded to first form a low moisture pellet shaped composition. The pellets are cooked or baked in a fashion similar to making rice cakes. A number of the pellets are placed in a small container at a high temperature and under pressure. When the pressure is released, the residual water boils and the pellets expand or puff and fuse to form a light, low moisture snack. The unflavored snack food is sprayed with oil in a tumbler or coating pan followed by the addition of salt or other dry flavoring which is coated on some or all of the surface by the tumbling action and the adhesive character of the oil. This may be followed by a heating step to provide the desired texture, color and moisture. In this example, the oil that is typically sprayed onto the puffed snack food is replaced with the improved adhesive.

100 kilogram of unflavored soy crisps with a composition that includes 22% protein, 6% Fat, 2% ash, 3% moisture and 67% carbohydrate, are placed in a tumbler or coating pan and sprayed with 12 to 15 kilograms of an adhesive composition consisting of 81 parts of soy milk, USDA reference 16120, plus 19 parts of soy protein isolate that is 80% protein. While being tumbled, the 5 kilograms of powdered barbeque flavor are added so that the crisps are coated with the powdered flavor and color. The flavored crisps are then dried to less than 10% moisture in preparation for packaging. The yield is approximately 108 to 110 Kg after spraying with the adhesive, adding powdered flavoring and baking to reduce the moisture content. Table 11 shows the composition of soy crisps made with the improved adhesive and the composition of similar crisps with the barbeque flavoring added after spraying the crisps with oil. As with the previous examples, Table 8 demonstrates that the protein quality has not changed, but the protein content for the improved crisp is higher and the fat content is lower. Also, the improved adhesive provided more than 6.25 grams of soy protein per serving, and the packaging can carry an FDA approved "Heart Healthy" logo and claim due to the cholesterol lowering effect of more than 6.25 grams of soy protein.

Note that these are only examples and should not be considered to be limiting. Those practiced in the art of snack food manufacturing may obtain many different ratios for the Daily Intake Values for Fat, Carbohydrate and Protein with a wide range of snack foods utilizing a wide range of compositions for the improved adhesive. Food companies do not have to claim the Daily Intake of Protein and can still benefit from the invention by lowering the fat content of popular snack foods.

REFERENCES

USDA Database (2011), USDA National Nutrient Database for Standard Reference, Release 27
21 CFR 101.9(c)(7) Title 21, U.S. Code of Federal Regulations, Section 101, Subsection 9(c)(7)
U.S. Food and Drug Administration Guidance for Industry: A Food Labeling Guide (2013)
FAQ Food and Nutrition Report 92, Dietary Protein Quality Evaluation in Human Nutrition (2011) (especially pages 11, 19 and Table 5 on page 29).
Millward, D. J., (2012) British Journal of Nutrition 108, 531-534
Ebnesajjad, Sina (2010). "History of Adhesives". Handbook of Adhesives and Surface Preparation: Technology, Applications and Manufacturing, Elsevier
E. M. Petrie (2007) "Handbook of Adhesives and Sealants, McGraw Hill
U.S. Pat. No. 8,741,370 to G. M. Ganjyal et al.
U.S. Pat. No. 7,691,430 to C. H. Marsland
U.S. Pat. No. 7,556,836 to I. Meuller et al.
U.S. Pat. No. 6,830,768 to S. Neidlinger et al.
U.S. Pat. No. 4,212,892 to N H. Chanhine and J. A. Brothers
U.S. Pat. No. 8,697,159 to T. J. Nack et al.
U.S. Pat. No. 5,894,027 to M. Kazenzadeh
U.S. Pat. No. 4,260,637 to J. M. Rispoli et al.
U.S. Pat. No. 3,830,941 to L. R. Luft et al.
U.S. Pat. No. 8,697,159 to T. J. Nack et al.
U.S. Pat. No. 8,551,544 to Borders et al.
U.S. Patent Application 20080317907 by J. K. Thomas et al.

LIST OF TABLES

Table 1. Snack Foods from the USDA National Nutrient Database for Reference Foods.
Table 2. Essential Amino Acid Requirements:
Table 3. Snack Food Protein, Protein Quality and Contributing Daily Intake
Table 4. Snack Food Nutrient Intake as a Percentage of the Recommended Daily Intake.
Table 5. Composition of USDA 19056 Salted Tortilla Chips and Chips Using an Improved Adhesive
Table 6. Nutrition Facts for USDA 19056 Salted Tortilla Chips and Chips Using an Improved Adhesive
Table 7. Composition of USDA 19056 Salted Tortilla Chips and Chips Using an Improved Adhesive
Table 8. Nutrition Facts for USDA 25037 Salted Pita Chips and Chips Using an Improved Adhesive
Table 9. Composition of USDA 19410 Salted Potato Crisps Made from Dried Potato and Sprayed with Oil Compared to Crisps Made from Dried Potato and Sprayed with an Improved Adhesive
Table 10. Nutrition Facts for USDA 19410 Salted Potato Crisps from Dried Potato and Salted Potato Crisps Using an Improved Adhesive
Table 11. Composition of current Barbeque Flavored Soy Crisps Sprayed with Oil Compared to Soy Crisps Sprayed with an Improved Adhesive
Table 12. Nutrition Facts for Barbeque Flavored Soy Crisps Using Oil as the Adhesive compared to Soy Crisps Using an Improved Adhesive

TABLE 1

Snack Foods from the USDA National Nutrient Database for Reference Foods.

| Reference Number | Description | Nutrient Profile in grams per 100 gram of Food | | | | |
|---|---|---|---|---|---|---|
| | | Moisture | Protein | Fat | Ash | Carbohydrate |
| 19056 | Tortilla chips, plain, white corn, salted | 2.64 | 7.10 | 20.7 | 1.79 | 67.8 |
| 19424 | Tortilla chips, nacho, reduced fat | 1.30 | 8.70 | 15.2 | 3.20 | 71.6 |
| 19003 | Extruded Corn chips, plain | 1.07 | 6.17 | 33.4 | 2.13 | 56.9 |
| 19004 | Extruded corn chips Barbeque | 1.20 | 7.00 | 32.7 | 2.80 | 56.2 |
| 25037 | Pita chips, salted | 2.00 | 11.8 | 15.2 | 2.75 | 68.3 |
| 19420 | Sesame Sticks | 2.00 | 10.9 | 36.7 | 3.90 | 46.5 |
| 19410 | Potato chips from dried potatoes | 2.37 | 4.62 | 35.3 | 2.34 | 55.4 |
| 19412 | Potato chips, dried potatoes, cheese flavored | 1.90 | 7.00 | 37.0 | 3.50 | 50.6 |

TABLE 2

Essential Amino Acid Requirements:

| Amino Acid | mg Required per gram of Protein |
|---|---|
| Histidine | 18 |
| Isoleucine | 31 |
| Leucine | 63 |
| Lysine | 52 |
| Cysteine + Methionine | 25 |
| Tyrosine + Phenylalanine | 46 |
| Threonine | 27 |
| Trytophan | 7.7 |
| Valine | 41 |

TABLE 3

Snack Food Protein, Protein Quality and Contributing Daily Intake

| Reference Number | Description | Protein g per 28 g Serving | Lysine mg per g Protein | Amino Acid Score | g of Protein as part of the Daily intake of Protein |
|---|---|---|---|---|---|
| 19056 | Tortilla chips, white corn, salted | 2.01 | 31.8 | 66% | 1.33 |
| 19424 | Tortilla chips, Nacho, reduced fat | 2.47 | 36.4 | 76% | 1.88 |
| 19003 | Extruded Corn chips, plain | 1.73 | 30.0 | 62% | 1.08 |
| 19004 | Extruded Corn Chips Barbeque | 1.98 | 40.9 | 85% | 1.69 |
| 25037 | Pita chips, salted | 3.34 | 15.3 | 32% | 1.06 |
| 19820 | Sesame Sticks | 3.09 | 33.0 | 69% | 2.13 |
| 19410 | Potato chips from dried potatoes | 1.29 | 80 | 100% | 1.29 |
| 19412 | Potato chips, dried potatoes: cheese flavored | 1.98 | 68 | 100% | 1.98 |

TABLE 4

Snack Food Nutrient Intake as a Percentage of the Recommended Daily Intake.

| Reference Number | Description | Fat | | Carbohydrate | | Protein | |
|---|---|---|---|---|---|---|---|
| | | gram | % DV | gram | % DV | gram | % DV |
| 19056 | Tortilla chips, white corn, salted | 5.86 | 9.0% | 19.2 | 6.4% | 1.33 | 2.7% |
| 19424 | Tortilla chips, Nacho, reduced fat | 4.31 | 6.6% | 20.3 | 6.8% | 1.88 | 3.8% |
| 19003 | Extruded Corn chips, plain | 9.46 | 14.6% | 16.1 | 5.4% | 1.08 | 2.2% |
| 19004 | Extruded Corn Chips Barbeque | 9.2 | 14.3% | 15.9 | 5.3% | 1.69 | 3.4% |
| 25037 | Pita chips, salted | 4.31 | 6.6% | 19.4 | 6.5% | 1.06 | 2.1% |
| 19820 | Sesame Sticks | 10.4 | 16.0% | 13.2 | 4.4% | 2.13 | 4.2% |
| 19410 | Potato chips from dried potatoes | 9.88 | 15.2% | 15.5 | 5.2% | 1.29 | 2.6% |
| 19412 | Potato chips, dried potatoes, cheese flamed | 10.5 | 16.2% | 14.4 | 4.8% | 1.98 | 4.0% |

TABLE 5

Composition of USDA 19056 Salted Tortilla Chips and Chips Using an Improved Adhesive

| | g per 100 g of corn based Salted Tortilla Chips | |
|---|---|---|
| Nutrient | USDA 19506 | Improved by Invention |
| Moisture | 2.6 | 3.0 |
| Protein | 7.1 | 10.6 |
| Fat | 2.1 | 6.0 |
| Ash | 1.8 | 2.2 |
| Carbohydrate | 68 | 78 |
| Lysine | 0.225 | 0.470 |

TABLE 6

Nutrition Facts for USDA 19056 Salted Tortilla Chips and Chips Using an Improved Adhesive

| Nutrient Content per 28 g Serving | USDA 19506 | Improved by Invention |
|---|---|---|
| Fat (g/28 g) | 5.8 | 1.7 |
| Carbohydrate (g/28 g) | 19 | 22 |
| Protein (g/28 g) | 2.0 | 3.0 |
| Lysine* (mg/28 g) | 63 | 132 |
| Correction for Amino Acid Score** | 62% | 87% |
| Protein contributing to Daily Intake | 1.2 g | 2.8 g |
| Percentage of the Daily Value, % DV*** | 2% | 5% |

*Lysine is the limiting Essential Amino Acid for Tortilla Chips
**Correction Factor = mg of Lysine per gram of Protein divided by requirement of 51 mg of Lysine per gram of protein
***Assumes the Daily Intake requirement for protein is 50 g per day. % DV is rounded to the nearest whole percentage.

TABLE 7

Composition of USDA 19056 Salted Tortilla Chips and Chips Using an Improved Adhesive

| | g per 100 g of Wheat based Salted Pita Chips | |
|---|---|---|
| Nutrient | USDA 25037 | Improved by Invention |
| Moisture | 2.0 | 3.0 |
| Protein | 11.8 | 15.0 |
| Fat | 15.2 | 7.2 |
| Ash | 2.8 | 3.0 |
| Carbohydrate | 68.3 | 71.8 |
| Lysine | 0.181 | 0.552 |

TABLE 8

Nutrition Facts for USDA 25037 Salted Pita Chips and Chips Using an Improved Adhesive

| Nutrient Content per 28 g Serving | USDA 25037 | Improved by Invention |
|---|---|---|
| Fat (g/28 g) | 4.3 | 2.0 |
| Carbohydrate (g/28 g) | 19 | 21 |
| Protein (g/28 g) | 3.3 | 4.2 |
| Lysine* (mg/28 g) | 51 | 155 |
| Correction for Amino Acid Score** | 30% | 72% |
| Protein contributing to Daily Intake | 1.1 g | 3.0 g |
| Percentage of the Daily Value, % DV*** | 2% | 6% |

*Lysine is the limiting Essential Amino Acid for Pita Chips
**Correction Factor = mg of Lysine per gram of Protein divided by requirement of 51 mg of Lysine per gram of protein
***Assumes the Daily Intake requirement for protein is 50 g per day. % DV is rounded to the nearest whole percentage.

TABLE 9

Composition of USDA 19410 Salted Potato Crisps Made from Dried Potato and Sprayed with Oil Compared to Crisps Made from Dried Potato and Sprayed with an Improved Adhesive

| | g per 100 g of Salted Potato Crisp | |
|---|---|---|
| Nutrient | USDA 19410 | Improved by Invention |
| Moisture | 2.4 | 3.2 |
| Protein | 4.6 | 9.0 |
| Fat | 35 | 9.2 |
| Ash | 2.3 | 3.3 |
| Carbohydrate | 55 | 75 |

TABLE 10

Nutrition Facts for USDA 19410 Salted Potato Crisps from Dried Potato and Salted Potato Crisps Using an Improved Adhesive

| Nutrient Content per 28 g Serving | USDA 19410 | Improved by Invention |
|---|---|---|
| Fat (g/28 g) | 99 | 2.6 |
| Carbohydrate (g/28 g) | 15.5 | 21 |
| Protein (g/28 g) | 1.3 | 2.5 |
| Correction for Amino Acid Score* | 100% | 100% |
| Protein contributing to Daily Intake | 1.3 g | 2.5 g |
| Percentage of the Daily Value, % DV** | 3% | 5% |

*Protein Correction Factor for Daily Value calculation = 100% because none of the Amino Acids are below the required amount per gram of protein.
**Assumes the Daily Intake requirement for protein is 50 g per day. % DV is rounded to the nearest whole percentage.

TABLE 11

Composition of current Barbeque Flavored Soy Crisps Sprayed with Oil Compared to Soy Crisps Sprayed with an Improved Adhesive

| | g per 100 g of Barbeque Flavored Soy Crisp | |
|---|---|---|
| Nutrient | Oil as Adhesive | Improved by Invention |
| Moisture | 2.7 | 3.3 |
| Protein | 18.7 | 22.7 |
| Fat | 12.5 | 6.0 |
| Ash | 1.8 | 2.2 |
| Carbohydrate | 64 | 66 |

TABLE 12

Nutrition Facts for Barbeque Flavored Soy Crisps Using Oil as the Adhesive compared to Soy Crisps Using an Improved Adhesive

| Nutrient Content per 28 g Serving | Oil as Adhesive | Improved by Invention |
|---|---|---|
| Fat (g/28 g) | 3.5 | 1.7 |
| Carbohydrate (g/28 g) | 15.5 | 21 |
| Protein (g/28 g) | 5.2 | 6.3*** |
| Correction for Amino Acid Score* | 100% | 100% |
| Protein contributing to Daily Intake | 5 g | 6 g*** |
| Percentage of the Daily Value, % DV** | 3% | 5% |

*Protein Correction Factor for Daily Value calculation = 100% because none of the Amino Acids are below the required amount per gram of protein.
**Assumes the Daily Intake requirement for protein is 50 g per day. % DV is rounded to the nearest whole percentage.
***More than 6.25 g of soy protein per serving allows a "Heart Healthy" claim due to the cholesterol lowering effect.

What is claimed is:

1. A snack food composition comprising a snack food having an adhesive composition applied thereto at 5% to 25% (w/w) of the snack food, wherein when applied to the snack food the adhesive composition comprises:
   60% to 90% liquid milk; and
   4% to 30% (w/w) added protein having an Amino Acid Score of 1.0 or higher;
   wherein the added protein in the adhesive composition consists of protein from one or more of egg, milk, and soy,
   wherein the adhesive composition applied to the snack food provides 1 gram to 6 grams of protein per 28 gram serving of the snack food, and wherein after application of the adhesive composition, greater than 70% of the total protein in the snack food composition contributes to the Daily Intake of Protein.

2. The snack food composition of claim 1, wherein the liquid milk in the adhesive composition is selected from the group consisting of:
   (a) a liquid milk protein concentrate or isolate;
   (b) a reconstituted milk protein concentrate or isolate;
   (c) Evaporated milk, and
   (d) A milk derived from a vegetable source selected from one or more of:
      a. Soy milk,
      b. Almond milk, or
      c. Rice milk.

3. The adhesive of claim 2, wherein the liquid milk is skim milk, concentrated milk, evaporated milk, reconstituted milk, or adjusted milk.

4. The snack food composition of claim 1, wherein the liquid milk in the adhesive composition comprises an imitation milk derived from vegetable sources or a dairy analog.

5. The adhesive of claim 4, wherein the liquid milk comprises soy milk, rice milk or almond milk.

6. The snack food composition of claim 1, where the added protein in the adhesive composition is chosen from one or more of dried milk, milk protein concentrate, milk protein isolate, whey, whey protein concentrate, whey protein isolate, caseinate, milk micelles, precipitated milk proteins, soy protein concentrate, soy protein isolate, egg protein, or a combination thereof.

7. The snack food composition of claim 1, wherein the adhesive additionally comprises up to 20% (w/w) fat or oil from milk or vegetable sources.

8. The snack food composition of claim 1, wherein the snack food comprises a slice, chip, crisp, cracker or extrusion that has been baked, popped or puffed.

9. The snack food composition of claim 1, wherein the snack food comprises 1% to 10% (w/w) moisture.

10. The snack food composition of claim 1, wherein the snack food composition comprises less than 10% (w/w) moisture.

11. The snack food composition of claim 1, wherein the snack food composition comprises 20% to 70% protein.

12. The snack food composition of claim 1, wherein the snack food composition comprises 9 to 25% protein.

13. The snack food composition of claim 1, wherein the adhesive binds coloring to the surface of the snack food.

14. The snack food composition of claim 1, wherein the adhesive binds flavoring to the surface of the snack food.

15. The snack food composition of claim 1, wherein the adhesive composition comprises high quality proteins.

16. The snack food composition of claim 1, wherein the adhesive composition comprises a complimentary combination of proteins.

17. A method of preparing a snack food composition, the method comprising contacting a snack food with an adhesive composition such that the adhesive composition is applied to the snack food,
   wherein the snack food comprises 1% to 10% (w/w) moisture, and
   wherein the adhesive composition comprises:
      60% to 90% water; and
      4% to 30% (w/w) added protein having an Amino Acid Score of 1.0 or higher, wherein the added protein in the adhesive composition consists of protein from one or more of egg, milk, and soy,
   wherein the adhesive composition applied to the snack food provides 1 gram to 6 grams of protein per 28 gram serving of the snack food and wherein after application of the adhesive composition, greater than 70% of the total protein in the snack food composition contributes to the Daily Intake of Protein.

18. The method of claim 17, wherein the added protein in the adhesive composition is chosen from one or more of dried milk, milk protein concentrate, milk protein isolate, whey, whey protein concentrate, whey protein isolate, caseinate, milk micelles, precipitated milk proteins, soy protein concentrate, soy protein isolate, egg protein, or a combination thereof.

19. The method of claim 17, wherein the adhesive composition comprises up to 20% (w/w) fat or oil from milk or vegetable sources.

20. The method of claim 17, additionally comprising drying the snack food composition after contacting the snack food with the adhesive composition.

21. The method of claim 20, wherein the snack food composition comprises less than 10% (w/w) moisture after drying.

22. The method of claim 17, wherein the snack food composition comprise 9 to 25% protein.

23. The snack food composition of claim 17, wherein the snack food comprises a slice, chip, crisp, cracker or extrusion that has been baked, popped or puffed.

24. The method of claim 17, wherein the adhesive composition comprises high quality proteins.

25. The method of claim 17, wherein the adhesive composition comprises a complimentary combination of proteins.

* * * * *